United States Patent [19]
Kinoshita et al.

[11] Patent Number: 6,045,741
[45] Date of Patent: Apr. 4, 2000

[54] PREPARATION OF FLEXIBLE POLYURETHANE FOAM

[75] Inventors: Hideya Kinoshita, Yokohama; Noriyuki Yamaguchi; Hajime Hasegawa, both of Chigasaki, all of Japan

[73] Assignee: Bridgestone Corporation, Tokyo, Japan

[21] Appl. No.: 08/890,337

[22] Filed: Jul. 10, 1997

[30] Foreign Application Priority Data

Jul. 10, 1996 [JP] Japan ................................. 8-181021
Oct. 18, 1996 [JP] Japan ................................. 8-276100

[51] Int. Cl.$^7$ .......................... B29C 43/02; B29C 44/02
[52] U.S. Cl. ............................................. 264/321; 264/54
[58] Field of Search ................................. 264/321, 54

[56] References Cited

U.S. PATENT DOCUMENTS

| | | |
|---|---|---|
| 2,659,935 | 11/1953 | Hammon ................................. 264/321 |
| 3,060,137 | 10/1962 | Gemeinhardt et al. ................. 264/321 |
| 3,300,558 | 1/1967 | Grant et al. ............................. 264/321 |
| 3,329,759 | 7/1967 | Rice ........................................ 264/321 |
| 3,862,282 | 1/1975 | Watson ................................... 264/321 |
| 4,731,391 | 3/1988 | Garvey ................................... 521/137 |
| 4,985,467 | 1/1991 | Kelly et al. .............................. 521/52 |
| 5,336,695 | 8/1994 | Nass et al. ........................... 521/109.1 |
| 5,721,295 | 2/1998 | Bruggemann et al. ................... 524/44 |

*Primary Examiner*—Allan R. Kuhns
*Attorney, Agent, or Firm*—Sughrue, Mion, Zinn Macpeak & Seas, PLLC

[57] ABSTRACT

A flexible polyurethane foam is prepared by reacting a polyol with an isocyanate in the presence of water, a catalyst, a foam stabilizer and other aids. A polyol containing a hydrophilic organic acid metal salt and/or a polymer thereof is used as the polyol. The polyurethane foam is compressed to a thickness of 5 to 80% of its initial thickness. The resulting polyurethane foam has a water absorption comparable to PVA foam.

15 Claims, No Drawings

PREPARATION OF FLEXIBLE POLYURETHANE FOAM

FIELD OF THE INVENTION

This invention relates to a method for preparing a flexible polyurethane foam having improved water absorption.

BACKGROUND OF THE INVENTION

Highly water absorbing foams have been used for cleaning a surface and for maintaining and removing water contents in a variety of fields including applications where water contents should be avoided or kept, for example, as wipers for wiping off water from any surface in clean rooms where semiconductors, hard discs, and liquid crystal display glass plates are produced, swabs for cleaning building glazing, articles for water wiping after car wash, for sweat absorption and thermal insulation, and for aqueous cultivation as well as wipers, ink absorbers, water-absorbing rolls, and household goods.

In the prior art manufacture of business machines, Freon was used to clean hard discs. Since the recognition of the fact that Freon is deleterious to the global environment by breaking the ozone layer, Freon washing has been replaced by water washing. It is then necessary to completely remove water after washing. There is a need for a material which is useful for water removal.

Most water absorbing foams used in such applications are PVA foams based on polyvinyl alcohol. Special polyurethane foams obtained by modifying flexible polyurethane foam which is originally hydrophobic so that it may become water absorbing are used in some applications as disclosed in U.S. Pat. Nos. 5,460,655 and 5,415,627.

The currently used PVA foams have a sufficient water absorbing capacity, but when dried, convert into a non-elastic solid state, which can damage or deform objective surfaces upon reuse. Additionally, the PVA foams are expensive.

While polyurethane foams are prepared using a polyol as one of main raw materials, it was proposed to increase the water absorbing capacity of polyurethane foam by using a special polyol containing much ethylene oxide. The resulting foam remains flexible and elastic even in a dry state, and its water absorbing capacity is improved to some extent, but not comparable to that of PVA foams. Since a special polyol is used, the foam is naturally expensive.

SUMMARY OF THE INVENTION

An object of the present invention is to provide a method of preparing a flexible polyurethane foam which has a high water absorbing capacity at least comparable to that of PVA foams, remains flexible and elastic enough to cause no damage to objective surfaces, and is relatively inexpensive.

According to the present invention, there is provided a method for preparing a flexible polyurethane foam comprising the steps of reacting a polyol with an isocyanate in the presence of water to form a flexible polyurethane foam, the polyol comprising a polyol containing a hydrophilic organic acid metal salt and/or a polymer thereof, and compressing the polyurethane foam to a thickness of 5 to 80% of its initial thickness. Preferably, the polyol containing a hydrophilic organic acid metal salt and/or a polymer thereof constitutes 20 to 100% by weight of the entire polyol. The organic acid metal salt or the polymer thereof is typically sodium acrylate or sodium polyacrylate. The polyurethane foam is compressed to a thickness of 5 to 80% of its initial thickness.

According to the present invention, by using a polyol containing a hydrophilic organic acid metal salt and/or a polymer thereof, a flexible polyurethane foam which is essentially hydrophobic is modified to be hydrophilic. By compressing the foam, its surface state is made finer to promote the capillary phenomenon for enhancing a water absorbing capacity.

DETAILED DESCRIPTION OF THE INVENTION

In the present invention, a flexible polyurethane foam is prepared using a polyol, an isocyanate, water, and occasionally a catalyst, a foam stabilizer and other aids.

According to the invention, a specific polyol containing a hydrophilic organic acid metal salt and/or a polymer thereof is used as a part or all of the polyol.

As the organic acid, acrylic acid is preferably used. As the polymer thereof, polyacrylic acid is preferred. The hydrophilic organic acid metal salt is preferably selected from potassium, sodium, magnesium, tin, copper, lithium and silver salts of the organic acid. Among them, potassium and sodium salts are more preferred.

The polyols to which the organic acid metal salt or the polymer thereof is contained include polyether polyols obtained, for example, by adding propylene oxide or ethylene oxide to glycerine, trimethylolpropane or diethylene glycol, although the type of the base polyol is not critical.

The polyol preferably has an OH value of 10 to 100, especially 20 to 60.

The specific polyol is preferably a mixture of the (base) polyol and the organic acid metal salt or the polymer thereof in a weight ratio between 50/50 and 95/5.

The specific polyol containing an organic acid metal salt and/or a polymer used in the present invention is preferably one prepared by adding and mixing an organic acid metal salt such as sodium acrylate in a polyol such as a polyether polyol and then polymerizing the organic acid metal salt such as sodium acrylate to produce a polymer of the organic acid metal salt such as sodium polyacrylate in the polyol. The organic acid metal salt is not reacted with the polyol. However, by producing a polymer of the organic acid metal salt such as sodium polyacrylate in the polyol, there is obtained a polymer of the organic acid metal salt having a mean particle size of about 0.5 to about 10 μm. Since the conventional sodium polyacrylate has a mean particle size of about 100 μm, the polymer such as sodium polyacrylate which is produced in the polyol has very fine particles. In addition, the polymer produced in the polyol is involved in the polyol. Therefore, the polymer such as sodium polyacrylate does not easily fall out from the polyol or the resulting polyurethane foam, whereby the polyurethane foam maintains its excellent water absorption property for a long period of use as compared with a polyurethane foam prepared by simply mixing a polymer of an organic acid metal salt such as sodium polyacrylate to a polyurethane foam forming composition comprising a polyol, an isocyanate and water and foaming the composition.

Moreover, in case of mixing a polymer of an organic acid metal salt to a polyurethane foam forming composition comprising a polyol, an isocyanate and water, the resulting composition will have a high viscosity and may be difficult to produce a polyurethane foam. On the other hand, the use of the polyol involving the polymer such as sodium polyacrylate therein can avoid such inconvenience.

The specific polyol containing the organic acid metal salt or the polymer thereof is used in admixture with another polyol.

The other polyol which is used in admixture with the specific polyol containing the organic acid metal salt and/or a polymer thereof is not critical. A choice may be made of polyether polyols and polyester polyols which are used in the preparation of conventional flexible polyurethane foams. Examples of polyether polyols include those obtained by adding propylene oxide or ethylene oxide to glycerine, trimethylolpropane or diethylene glycol. Examples of polyester polyols include those obtained by adding adipic acid to diethylene glycol, trimethylolpropane or glycerine.

The specific polyol containing the organic acid metal salt or the polymer thereof should preferably constitute about 20 to 100%, more preferably about 50 to 100% by weight of the entire polyol. Then the polyol component becomes hydrophilic whereby the resultant polyurethane is improved in water absorption. Less than 20% by weight of the specific polyol would fail to provide the desired water absorption.

As to the isocyanate, a choice may be made of organic isocyanates which are used in the preparation of conventional flexible polyurethane foams, although tolylene diisocyanate (TDI) and diphenylmethane-4,4'-diisocyanate (MDI) are useful, with the MDI being recommended.

The diisocyanate is used in the conventional amount for preparing a flexible polyurethane foam, preferably in an amount of 20 to 100 parts by weight, more preferably 50 to 100 parts by weight per 100 parts by weight of the entire polyols.

Water is also used in the conventional amount for preparing a flexible polyurethane foam, preferably in an amount of 1 to 7 parts by weight, more preferably 1 to 5 parts by weight of the entire polyols.

In the present invention, a catalyst, a crosslinking agent, a foam stabilizer and other aids may be blended to the formulation for preparing a flexible polyurethane foam.

When the specific polyol is used, reactivity is, of course, retarded as compared with conventional reaction systems and the resulting foam becomes softer than foams of conventional formulations. A crosslinking agent may be used for increasing the hardness. When the highly water absorbing flexible polyurethane foam is used in the application requiring strict water removal, it is desired that no substances bleed out of the foam and adhere to an objective surface in contact with the foam. To this end, a reactive catalyst or foam stabilizer is desirably used so that no substances might be leached out of the foam and adhere to the objective surface to be wiped with the foam.

The catalyst used herein is generally selected from amine catalysts commonly used in the expansion of conventional flexible polyurethane. Examples of the amine catalysts include tetramethylhexamethylenediamine, pentamethyldiethylenetriamine, dimethylcyclohexylamine, bis(dimethylaminoethyl)ether, tetramethylpropylenediamine, trimethylaminoethylpiperazine, tetramethylethylenediamine, dimethylbenzylamine, methylmorpholine, ethylmorpholine, and triethylenediamine. Where the leaching-out of the catalyst raises a problem, reactive amine catalysts such as dimethylaminoethoxyethoxyethanol and dimethylaminohexanol are preferred.

The catalyst is used in an amount of 0.001 to 5 parts by weight, especially 0.1 to 2 parts by weight of the entire polyols.

A crosslinking agent may be blended in some applications where high hardness is desired. Examples of the crosslinking agent include trimethylolpropane, diethylene glycol, 1,4-butanediol and dipropylene glycol, and addition products of propylene oxide and/or ethylene oxide thereto.

The crosslinking agent is used in an amount of 0 to 10 parts by weight, especially 1 to 5 parts by weight of the entire polyols.

The foam stabilizer used herein is generally selected from silicone foam stabilizers commonly used in the expansion of conventional flexible polyurethane.

The foam stabilizer is used in an amount of 0.1 to 3 parts by weight, especially 0.5 to 1.5 parts by weight of the entire polyols.

The conditions for preparing a flexible polyurethane foam by foaming the formulation containing the above-said components may be the conventional conditions, although the foaming temperature is preferably in the range of 20 to 30° C.

The resulting flexible polyurethane foam preferably has a cell number of 10 to 70 per inch, more preferably 42 to 70 per inch. Less than 10 per inch would result in inferior water absorption. Over 70 per inch would cause the difficulty of producing polyurethane foam.

In the second step according to the present invention, the foam obtained using the specific polyol containing the organic acid metal salt and/or the polymer thereof and the isocyanate and optionally, a catalyst and foam stabilizer is then subject to thermal compression by means of a heat press. In one sense, the capillary phenomenon is enhanced by making the surface state of the foam finer. In another sense, the water absorbing capacity is increased by increasing the foam density. In either way, a flexible polyurethane foam having a high water absorbing capacity is completed. The polyurethane foam is compressed to a thickness of 5 to 80%, preferably 20 to 70% of its initial thickness. A foam compression factor of less than 5% results in a product which is satisfactory in performance and water absorption, but would be less durable and less cost effective. A foam compression factor of more than 80% would rather detract from water absorption. The polyurethane foam may be compressed in any desired direction.

EXAMPLE

Examples of the invention are given below by way of illustration and not by way of limitation.

Examples and Comparative Examples

One formulation within the scope of the invention and a conventional formulation are shown in Table 1.

TABLE 1

|  | Parts by weight | |
|---|---|---|
|  | Invention | Conventional |
| Polyol 1 | 100 | — |
| Polyol 2 | — | 100 |
| Crosslinking agent 1 | 5 | — |
| Water | 1.5 | 2.1 |
| Amine catalyst 1 | 0.5 | — |
| Amine catalyst 2 | 0.4 | — |
| Amine catalyst 3 | — | 0.35 |
| Amine catalyst 4 | — | 0.01 |
| Foam stabilizer 1 | 1.5 | — |
| Foam stabilizer 2 | — | 0.86 |

TABLE 1-continued

|  | Parts by weight | |
| --- | --- | --- |
|  | Invention | Conventional |
| Crosslinking agent 2 | 1.0 | — |
| Stannous octoate | — | 0.19 |
| Isocyanate | 26.8 | 29.3 |

Polyol 1: sodium polyacrylic containing polyether polyol "SQ-521" by Sanyo Chemical K.K., OH value = 30 (polyether polyol obtained by adding propylene oxide and ethylene oxide to glycerine to prepare a polyol and then mixing sodium acrylate to the polyol, followed by polymerizing sodium acrylate to produce sodium polyacrylate in the polyol)
Polyol 2: "V-3030" by Dow Chemical (polyether polyol obtained by adding propylene oxide to glycerine)
Crosslinking agent 1: "EX 430" by Asahi Glass K.K., molecular weight = 400, functional groups = 3, adduct of propylene oxide to glycerine
Amine catalyst 1: reactive amine catalyst "23P" by Kao K.K., dimethylaminoethoxyethoxyethanol
Amine catalyst 2: amine catalyst "HPW" by Toso K.K., N-methyl-N-hydroxyethylpiperazine
Amine catalyst 3: "DABCO-33LV" by Sankyo Airproducts K.K., triethylenediamine
Amine catalyst 4: "N-Ethylmorpholine" by Kao K.K., N-ethylmorpholine
Foam stabilizer 1: silicone surfactant "L5340" by Nihon Unicar K.K., adduct of ethylene oxide and propylene oxide to dimethylpolysiloxane
Foam stabilizer 2: "F242TB" by Shin-Etsu Silicone K.K., adduct of ethylene oxide and propylene oxide to dimethylpolysiloxane
Crosslinking agent 2: "T880" by Takeda Chemicals K.K., adduct of propylene oxide to trimethylolpropane
Stannous octoate: "Stannous Octoate" by Nitto Chemicals K.K.
Isocyanate: "T-80" by Nihon Polyurethane K.K., tolylenediisocyanate The formulation was formed at 25° C. to prepare a flexible polyurethane foam having a size of 300 mm (height)×800 mm (width)×200 mm (length). The cell number of the resulting foam is shown in Table 2.

A foam block of 100 mm×100 mm×10 mm was compressed by a heat press at 180° C. for 2 minutes to a thickness of 100%, 80%, 50%, 33% and 5% of the initial thickness. A compression factor (%) is (compressed thickness)/(initial thickness)×100%. A compression factor of 100% means that the foam block was not compressed. The products were measured for density, hardness, and water absorption. The density and hardness were measured according to JIS K6401.

Water Absorption Test

Method A: After a water droplet of 1 ml was dropped on a foam of thicker than 10 mm, the time (sec.) passed until the foam fully absorbed the water droplet was measured.

Method B: A foam specimen of 40 mm long by 15 mm wide by 10 mm thick was vertically set such that a lower portion of 10 mm was immersed in water. The time (sec.) passed until the foam sucked up water to a height B1 of 10 mm or a height B2 of 20 mm from the water surface was measured.

The results are shown in Table 2.

Table 2 also reports the physical properties of a PVC foam as a reference example.

TABLE 2

|  | Reference Example | Example 1 | Example 2 | Example 3 | Example 4 |
| --- | --- | --- | --- | --- | --- |
| Material | PVA foam | inventive formulation polyurethane foam | inventive formulation polyurethane foam | inventive formulation polyurethane foam | inventive formulation polyurethane foam |
| Cell number (/inch) | 70< | 55 | 55 | 55 | 55 |
| Compression factor (%) | 100 | 80 | 50 | 33 | 5 |
| Density (g/cm³) | 0.15 | 0.06 | 0.10 | 0.15 | 0.50 |
| Hardness | un-measurable | 4.0 | 5.0 | 10.2 | 25.4 |
| Water absorption A (sec) | 1 | 4 | 1 | 2 | 2 |
| Water absorption B1 (sec) | 2 | 14 | 8 | 9 | 10 |
| Water absorption B2 (sec) | 11 | 50 | 29 | 36 | 35 |

|  | Comparative Example 1 | Comparative Example 2 | Comparative Example 3 |
| --- | --- | --- | --- |
| Material | inventive formulation polyurethane foam | conventional formulation polyurethane foam | conventional formulation polyurethane foam |
| Cell number (/inch) | 55 | 50 | 50 |
| Compression factor (%) | 100 | 100 | 50 |
| Density (g/cm³) | 0.05 | 0.05 | 0.10 |
| Hardness | 2.1 | 8.0 | 15.2 |
| Water absorption A (sec) | 33 | 300< | 300< |
| Water absorption B1 (sec) | 77 | 300< | 300< |
| Water absorption B2 (sec) | 240< | 300< | 300< |

The urethane foam samples within the scope of the invention (Examples 1–4) show quicker water absorption than urethane foam samples of the conventional formulation (Comparative Examples 2 and 3). Among the urethane foam samples of the inventive formulation, the compressed samples (Examples 1–4) show significantly greater water absorption than the intact sample (Comparative Example 1).

According to the invention, by using a polyol containing a hydrophilic organic acid metal salt and/or a polymer thereof, a flexible polyurethane foam which is essentially hydrophobic is modified to be hydrophilic. By compressing the foam, its surface state is made finer to promote the capillary phenomenon for enhancing a water absorbing capacity.

Japanese Patent Application No. 276100/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a flexible polyurethane foam comprising the steps of:

reacting a polyol-containing composition with an isocyanate in the presence of water to form a flexible polyurethane foam, wherein said polyol-containing composition comprises a mixture of a polyol and a hydrophilic organic acid metal salt and/or a polymer thereof; and thermally compressing the polyurethane foam to a thickness of 5 to 80% of its initial thickness by means of a heat press.

2. The method of claim 1 wherein said mixture of a polyol and a hydrophilic organic acid metal salt and/or a polymer thereof comprises 20 to 100% by weight of said polyol-containing composition.

3. The method of claim 1 wherein said mixture of a polyol and a hydrophilic organic acid metal salt and/or a polymer thereof is one prepared by mixing an organic acid metal salt with a polyol and polymerizing the organic acid metal salt in the polyol.

4. The method of claim 1 wherein the hydrophilic organic acid metal salt and/or the polymer thereof is sodium acrylate and/or sodium polyacrylate.

5. The method for preparing a flexible polyurethane foam as claimed in claim 1, wherein said polyol-containing composition comprises said mixture of a polyol and a hydrophilic organic acid metal salt and/or the polymer thereof in an amount of from 50 to 100% by weight based on the entire weight of said polyol-containing composition.

6. The method for preparing a flexible polyurethane foam as claimed in claim 1, wherein said mixture of a polyol and a hydrophilic organic acid metal salt and/or a polymer thereof has a weight ratio of polyol to hydrophilic organic acid metal salt and/or polymer thereof of between 50/50 and 95/5.

7. The method for preparing a flexible polyurethane foam as claimed in claim 1, wherein the polyurethane foam is compressed to a thickness of 20 to 70% of its original thickness.

8. A method for preparing a flexible polyurethane foam comprising the steps of:

reacting a polyol-containing composition with an isocyanate in the presence of water to form a flexible polyurethane foam, wherein said polyol-containing composition comprises a mixture of a polyol and a hydrophilic organic acid metal salt polymer, and said polyol-containing composition comprises said mixture of a polyol and a hydrophilic organic acid metal salt polymer in an amount of from 20 to 100% by weight based on the entire weight of said polyol-containing composition, said mixture of a polyol and a hydrophilic organic acid metal salt polymer being one prepared by mixing a polymerizable organic acid metal salt with a polyol and polymerizing the organic acid metal salt to produce a polymer of the organic acid metal salt in the polyol; and thermally compressing the polyurethane foam to a thickness of 5 to 80% of its initial thickness by means of a heat press.

9. The method for preparing a flexible polyurethane foam as claimed in claim 8, wherein said polyol-containing composition comprises said mixture of a polyol and a hydrophilic organic acid metal salt polymer in an amount of from 50 to 100% by weight based on the entire weight of said polyol-containing composition.

10. The method for preparing a flexible polyurethane foam as claimed in claim 8, wherein during the polymerization of the hydrophilic organic acid metal salt to produce a polymer of the organic acid metal salt in the polyol, the organic acid metal salt does not react with the polyol.

11. The method for preparing a flexible polyurethane foam as claimed in claim 8, wherein the polymer of the hydrophilic organic acid metal salt in the polyol has a mean particle size of about 0.5 to about 10 $\mu$m.

12. The method for preparing a flexible polyurethane foam as claimed in claim 8, wherein said mixture of a polyol and a hydrophilic organic acid metal salt polymer has a weight ratio of polyol to hydrophilic organic acid metal salt polymer of between 50/50 and 95/5.

13. The method for preparing a flexible polyurethane foam as claimed in claim 8, wherein the polyurethane foam is compressed to a thickness of 20 to 70% of its original thickness.

14. A method for preparing a flexible polyurethane foam comprising the steps of:

reacting a polyol-containing composition with an isocyanate in the presence of water to form a flexible polyurethane foam, wherein said polyol-containing composition comprises a mixture of a polyol and a sodium acrylate and/or sodium polyacrylate, and said polyol-containing composition comprises said mixture of a polyol and a sodium acrylate and/or sodium polyacrylate in an amount of from 20 to 100% by weight based on the entire weight of said polyol-containing composition; and thermally compressing the polyurethane foam to a thickness of 5 to 80% of its initial thickness by means of heat press.

15. The method for preparing a flexible polyurethane foam as claimed in claim 14, wherein said polyol-containing composition comprises said mixture of a polyol and sodium acrylate and/or sodium polyacrylate in an amount of from 50 to 100% by weight based on the entire weight of said polyol-containing composition.

* * * * *